US007491340B1

(12) United States Patent
Von Krosigk et al.

(10) Patent No.: US 7,491,340 B1
(45) Date of Patent: Feb. 17, 2009

(54) METHOD FOR TREATING A LIVING ORGANISM USING A FLUID WITH INCREASED OXYGEN CONCENTRATION AND REDUCED SURFACE TENSION

(75) Inventors: James Richard Von Krosigk, Nixon, TX (US); Larry John Dove, Okotoks (CA)

(73) Assignee: Innovative Industries, Inc., Baton Rouge, LA (US)

( * ) Notice: Subject to any disclaimer, the term of this patent is extended or adjusted under 35 U.S.C. 154(b) by 337 days.

(21) Appl. No.: 11/139,134

(22) Filed: May 27, 2005

Related U.S. Application Data

(60) Provisional application No. 60/575,890, filed on Jun. 1, 2004.

(51) Int. Cl.
*B01D 35/06* (2006.01)

(52) U.S. Cl. ...................................... 210/748; 210/695

(58) Field of Classification Search ................ 210/695, 210/748
See application file for complete search history.

(56) References Cited

U.S. PATENT DOCUMENTS

| | | | | |
|---|---|---|---|---|
| 4,214,962 | A | 7/1980 | Pincon | 204/157.1 R |
| 4,274,959 | A * | 6/1981 | Roediger | 210/221.2 |
| 4,274,970 | A | 6/1981 | Beitzel | 210/748 |
| 4,755,288 | A * | 7/1988 | Mitchell et al. | 210/85 |
| 5,057,230 | A * | 10/1991 | Race | 210/758 |
| 5,304,289 | A | 4/1994 | Hayakawa | |
| 5,326,446 | A * | 7/1994 | Binger | 204/663 |
| 5,988,601 | A * | 11/1999 | Burgess | 261/34.1 |
| 6,390,023 | B1 * | 5/2002 | Reynolds | 119/72 |
| 6,623,695 | B2 | 9/2003 | Malcheskey | 422/12 |
| 2005/0279713 | A1 | 12/2005 | Osborn et al. | |

FOREIGN PATENT DOCUMENTS

JP 56024032 A * 3/1981

OTHER PUBLICATIONS

The Random House College Dictionary, Revised Edition. Jess Stein, ed. 1980. Random House, Inc. p. 1089.*
U.S. Appl. No. 60/574,152 for U.S. Publication No. 2005/0279713: Osborn et al., System and Method for Dissolving Gases in Liquids, May 25, 2004.

* cited by examiner

*Primary Examiner*—Leon B. Lankford, Jr.
*Assistant Examiner*—Susan E. Fernandez
(74) *Attorney, Agent, or Firm*—Buskop Law Group, PC; Wendy Buskop

(57) ABSTRACT

A method for treating a living organism to increase nutrient ingestion. The step of the method are first treating a fluid stream for use by at least one living organism, in a surface tension modification generator (STMG) at a first pressure with a frequency minimize hydrogen bonding of the fluid forming a reduced surface tension stream. The next step is flowing the reduced surface tension stream through a port reducing the first pressure to a second pressure and adding oxygen. After oxygen is added, then flow the reduced surface tension stream with oxygen at the second pressure into an inner chamber. The next step is flowing the reduced surface tension stream and oxygen from the inner chamber through a plurality of funnels disposed in a wall of the inner chamber creating a turbid zone in an outer chamber, and wherein nano-sized oxygen particles are dissolved into the stream.

14 Claims, 3 Drawing Sheets

| treating a fluid stream for use by at least one living organism, in a surface tension modification generator (STMG) at a first pressure with a frequency from about 0.05 Hz to about 5000 Hz to minimize hydrogen bonding of the fluid forming a reduced surface tension stream [100] |
|---|
| ↓ |
| flowing the reduced surface tension stream through a port reducing the first

METHOD FOR TREATING A LIVING ORGANISM USING A FLUID WITH INCREASED OXYGEN CONCENTRATION AND REDUCED SURFACE TENSION

CROSS REFERENCE TO RELATED APPLICATIONS

The present application claims priority to U.S. Provisional Patent Application Ser. No. 60/575,890 filed on Jun. 1, 2004.

FIELD

The present embodiments relate to a method for treating a living organism using a fluid with increased oxygen content and reduced surface tension which can cause dramatic growth in aerobic bacteria.

BACKGROUND

A need exists for a method to treat animals, fish and crops with fluids that increase oxygen to the cells of these organisms. By increasing the oxygen to the cells, the organism has improved digestion, and the plant has improved nutrient uptake.

A need has existed to improve nutrient uptake for organisms so that living organisms more efficiently take in proteins and enzymes and other needed minerals for growth. For animals, the increased presence of oxygen keeps the digestive system in a beneficial aerobic state providing improving degradation of the food source. The present invention was created to address this nutrient uptake need.

A need has existed to reduce stress on individual cells of living organisms during the osmotic process, by providing increased amounts of nano-sized dissolved oxygen to those cells, particularly where water flows into the cells.

A need has existed for the petrochemical industry and the pulp and paper industry for a method which increases the presence of oxygen to bacteria present in the waste streams of that industry to improve biodegradation of pulp solids and other cellulose matter in those streams.

A need has existed to provide a method with low energy costs that increases oxygen content to bacteria used in breaking down solids and other materials in waste streams to provide improved aerobic degradation thereby reducing environmental problems and lowering the cost of clean up from these industrial processes.

Additionally a need exists for the petrochemical, and pulp and paper industry to have reduced energy consumption for remediation of their waste water ponds. The embodiments of this invention provides water with a lower surface tension and increased oxygen content, enabling the water to flow into and out of the bacteria cell, with significantly less impedance. This high rate of water flow into and out of the cell enables the microorganisms to reproduce more quickly, increasing colony counts, thereby consuming the waste of the petrochemical streams and the streams of the pulp and paper industry.

The methods of this invention meet all the above needs.

SUMMARY

The invention relates to a method for treating a living organism to increase nutrient ingestion.

The first step in the method is treating a fluid stream for use by at least one living organism, in a surface tension modification generator (STMG) at a first pressure with a frequency from about 0.05 Hz to about 5000 Hz to minimize hydrogen bonding of the fluid forming a reduced surface tension stream.

The next step in the method can be flowing the reduced surface tension stream through a port reducing the first pressure to a second pressure and adding oxygen.

After oxygen is added, the next step can be flowing the fluid with oxygen at the second pressure into an inner chamber.

Once the fluid is in the inner chamber, the next step is flowing the fluid and the oxygen from the inside chamber through a plurality of funnels disposed in a wall of the inside chamber to an outside chamber, forming a turbid area in the stream which causes nano-sized oxygen particle to be dissolved into the stream. Each funnel can comprise a large opening on a side engaging the inside chamber and a small opening on a side communicating with the outside chamber, and wherein each funnel is directed to create a triangle focal point of turbid fluid in the outer chamber which dissolves oxygen in the fluid forming an oxygenated stream.

The last step of the method can be flowing the oxygenated stream from the outer chamber and provided to the living organism.

BRIEF DESCRIPTION OF THE DRAWINGS

The present embodiments will be explained in greater detail with reference to the appended figures, in which.

Figure 1:
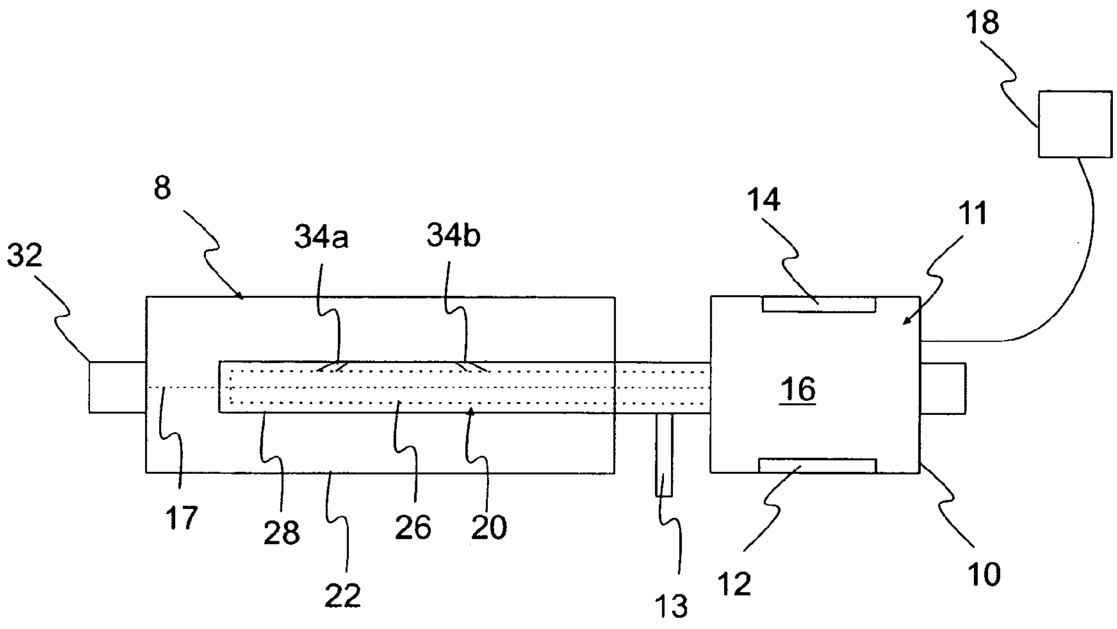
FIG. 1 depicts an overall diagram of an embodiment of the apparatus.

The present embodiments are detailed below with reference to the listed figures.

DETAILED DESCRIPTION OF THE EMBODIMENTS

Before explaining the present embodiments in detail, it is to be understood that the embodiments are not limited to the particular embodiments herein and it can be practiced or carried out in various ways.

The present embodiments describe a method for treating water that is provided to a living organism to increase nutrient ingestion of the living organism by administering a fluid containing nano-particle oxygen and having reduced surface tension.

A benefit of this invention increases oxygen to the cells of animals, fish and crops treated with fluids from this method. The animals should have improved digestion, and plants should have improved nutrient uptake.

A benefit of this invention is that by treating the living organisms with the fluids produced by this process, the living organisms have improved nutrient uptake of proteins and enzymes and other needed minerals for efficient growth.

Another benefit of this invention is the reduction of stress on individual cells of living organisms during the osmotic process, by providing increased amounts of nano-sized dissolved oxygen to those cells.

A benefit of this invention is increased concentrations of oxygen for bacteria used to biodegrade solids and other waste matter in the pulp and paper industry. The embodiments of this method provide water with a lower surface tension and increased oxygen content, enabling the water to flow into and out of the bacteria cell, with significantly less impedance. This high rate of water flow into and out of the cell enables the microorganisms to reproduce more quickly, increasing colony counts, thereby consuming the waste of the petrochemical streams and the streams of the pulp and paper industry.

The living organisms to which this method can be applied include fish, crustaceans, farm animals, macro-organisms, micro-organisms, humans, domestic animals, farm birds and animals in zoos and aquariums. Alternatively, the living organisms can be agricultural crops, aquaculture crops, house plants, or office plants. The agricultural crops can include corn, wheat, tomatoes, cucumbers, celery, peppers, lettuce, rice, cotton, kenaf, sugar cane, alfalfa, sorghum, and as well as other crops.

The method involves using an apparatus which is more fully defined below and in the Figures.

The method involves flowing water into a surface tension modification generator (STMG). The STMG includes a STMG chamber for receiving a pressured fluid at a first pressure. A pair of probes disposed in the STMG chamber then cause a frequency to be emitted that travels through the fluid in the chamber. The probes can be used to emit: a single radio frequency, similar variable frequencies, different rf frequencies relative to each pair of probes. From 2 to 12 probes can be used within the STMG chamber.

The STMG can alternatively generate magnetic fields which alters the surface tension of the fluid.

Next, the altered fluid is passed into an inside chamber of a multi-chambered device while oxygen is injected via a port. The oxygen can be injected into the fluid using a venturi effect generator, such as those from Mazzei, of Ventura, Calif. The venturi effect generator in addition to injecting oxygen, changes the pressure of the altered fluid from the first pressure in the STMG chamber to a lower second pressure in the inner chamber. It should be noted that the first pressure is a high pressure, the second pressure is a lower pressure than the first pressure.

The inner chamber then causes the fluid to flow out of the chamber into an outside chamber via at least two funnels which are formed in the walls of the inner chamber. From about 2 to about 168 funnels or more can be formed in the wall of the inner chamber. The funnels create a turbid fluid condition at a triangular focus point causing dissolved oxygen to move into the fluid at a molecular level, forming an oxygenated fluid. Each funnel can be angled from about 45 to about 90 degrees from the axis of the inner chamber, and they are generally directed at the focus point. A third pressure in the outside chamber is lower than the second pressure which attributes to the increased concentration of oxygen in the fluid stream.

This method creates sub-micron particles of oxygen that remain in fluids, which are contemplated to include water based fluids. The sub-micron or "nano-sized" particles of oxygen remain in the fluid where placed or sink to the bottom rather than rising to the surface and escaping from the fluid. The fluids usable with this method include water, mixtures of water, solutions of water, fluidized solids, suspensions and combinations thereof.

The phenomenon of increasing dissolved oxygen occurs because the sub-micron size of the oxygen particles are so small that the density of the fluid generally exceeds the upward force caused by the difference in density between the sub-micron oxygen particles and the fluid.

The method of this invention energizes the fluids, lowering the surface tension of the fluids.

A surface tension reduction generator can be an electrostatic voltage spike signal generator, two or more radio frequency signal generators, one or more antennas, a fluid conduit, and optionally one or more signal boosters.

For example, in water, the device energizes the water and satisfies the hydrogen ion (H+) attraction to the unshared pair of electrons on any adjacent water molecules. In turn, a true reduction in hydrogen bonding between water molecules occurs. The true reduction in hydrogen bonding is measured as surface tension reduction. Typically, water molecules link up to each other because of the dipole nature of the individual water molecules. The bent water molecule structure in the free-state has three fundamental variations: symmetrical stretch, symmetrical bend, and the asymmetrical bend. The additional negative charges or the equivalent in charge density provided in the solution by the embodied devices reduce the bonding of the oxygen atoms of water molecules and the hydrogen atoms of other water molecules by supplying the negative charges (electrons) that the oxygen atoms attract. As a result, less hydrogen bonding exists between the individual water molecules. The result is "energized" water resulting in benefits such as better cleaning water and better soil-leaching water.

Table 1 summarizes the surface tension of water before and after the water is "energized" using the embodied methods. The water is tested at a range of temperatures.

TABLE 1

| TEMPERATURE (° C.) | SURFACE TENSION—"UN-ENERGIZED" (erg/cm2) | SURFACE TENSION—"ENERGIZED" (erg/cm2) |
|---|---|---|
| 5 | 74.9 | 60.2 |
| 10 | 74.22 | 57.3 |
| 15 | 73.49 | 56.3 |
| 18 | 73.05 | 54.2 |
| 20 | 72.75 | 50.3 |
| 25 | 71.97 | 47.5 |
| 30 | 71.18 | 42.5 |
| 40 | 69.56 | 40.3 |
| 50 | 67.91 | 38.5 |
| 60 | 66.18 | 35.3 |
| 70 | 64.4 | 35.0 |
| 80 | 62.6 | 34.5 |

Combining the sub-micron oxygen generation and the energizing technologies provides a benefit to living organisms, machinery, processes, and substances. The increased presence of oxygen on the bottom of a given fluid source, such as a pond, affects the rate of microbial metabolic activity in the bottom of the pond. The increased presence of oxygen also provides a significant increase in water treating capacity.

When fluid is treated with the embodied method, this fluid is then provided to living organisms. The energized and super oxygenated fluid can be used to provide significant benefits in applications such as milk production, flower production, fruit production, crop production, vegetable production, shrimp production, egg production, meat production, waste fluid combustion, scale removal, water purification, fluid tracking, fluid sterilization and more. The lowering of the surface tension benefits crops by enhancing the capillary action of the root system. That enhancement carries more oxygen into the plant due to the increased oxygenation of the water. The method can be used to assist the transfer of oxygen into a plant or animal by reducing the energy required to overcome the surface tension of water allowing the water to assimilate into the animals or plants.

By using the pressure differentials on the fluid, and the turbulence of the fluid to cause nano-sized oxygen particles to dissolve into the fluid, a quick and cost-effective manner to transfer dissolved oxygen into a fluid or body of water occurs. For example, the method can be used to create billions of nano-oxygen particles to transfer to the bottom of a sludge pond to aid in bio-remediation at a faster rate than would otherwise occur in nature.

Ample dissolved oxygen (DO) is requisite for effective wastewater treatment, activated sludge, and the viability of natural-and-commercial marine ecosystems. The embodied method generates billions of nano-oxygen particles that are so small that the particles do not have enough mass to overcome the fluid's natural density and rise through the fluid. Therefore, the nano-oxygen particles sink or remain suspended in the water.

The embodied methods accelerate the rate of transfer of oxygen into fluid through the large surface area created by a population of nano-particles. The generated nano-oxygen particles can deliver approximately 5 cubic feet/minute (CFM) of oxygen using only one 0.5 HP pump.

With reference to the figures, FIG. 1 depicts an overall diagram of an embodiment of the apparatus for treating a fluid, such as a fluid containing water.

FIG. 1 depicts the apparatus usable with the method comprising an STMG (10) with an STMG chamber (11). Probes (12 and 14) are located in the STMG chamber (11) which can create a radio frequency to pass through a fluid (16). Although it should be noted at least two different frequencies can be used effectively in the STMG and produce the reduced surface tension fluid. The STMG (10) can be powered with an external power source (18).

A multi-chambered device (8) is shown with a inner chamber (20) and an outer chamber (22) enclosing the inner chamber. The outer chamber has an outer chamber exit port (32). The inner chamber (20) has an interior surface (26) and an exterior surface (28). The inner chamber (20) has an axis (17). The inner chamber has at least 2 funnels (34*a* and 34*b*) disposed in the walls of the inner chamber.

A port (13) is shown for delivering gas from a gas source to the inside chamber wherein the port in an embodiment is a venturi effect generator. Although the embodiments described emphasize oxygen the gas source can provide oxygen, ozone, air, ethylene, carbon dioxide, carbon monoxide, ethylene oxide, and other gases or combinations thereof.

The port can be used to flow oxygen into the inner chamber at a pressure from about 1 to about 100 psi.

The rate of flow into the inner chamber can be from about 0.5 gallons to about 600 gallons per minute.

In an embodiment, the method can use from two funnels to 168 funnels in the walls of the inner chamber to generate the requisite turbid flow conditions.

Figure 2:
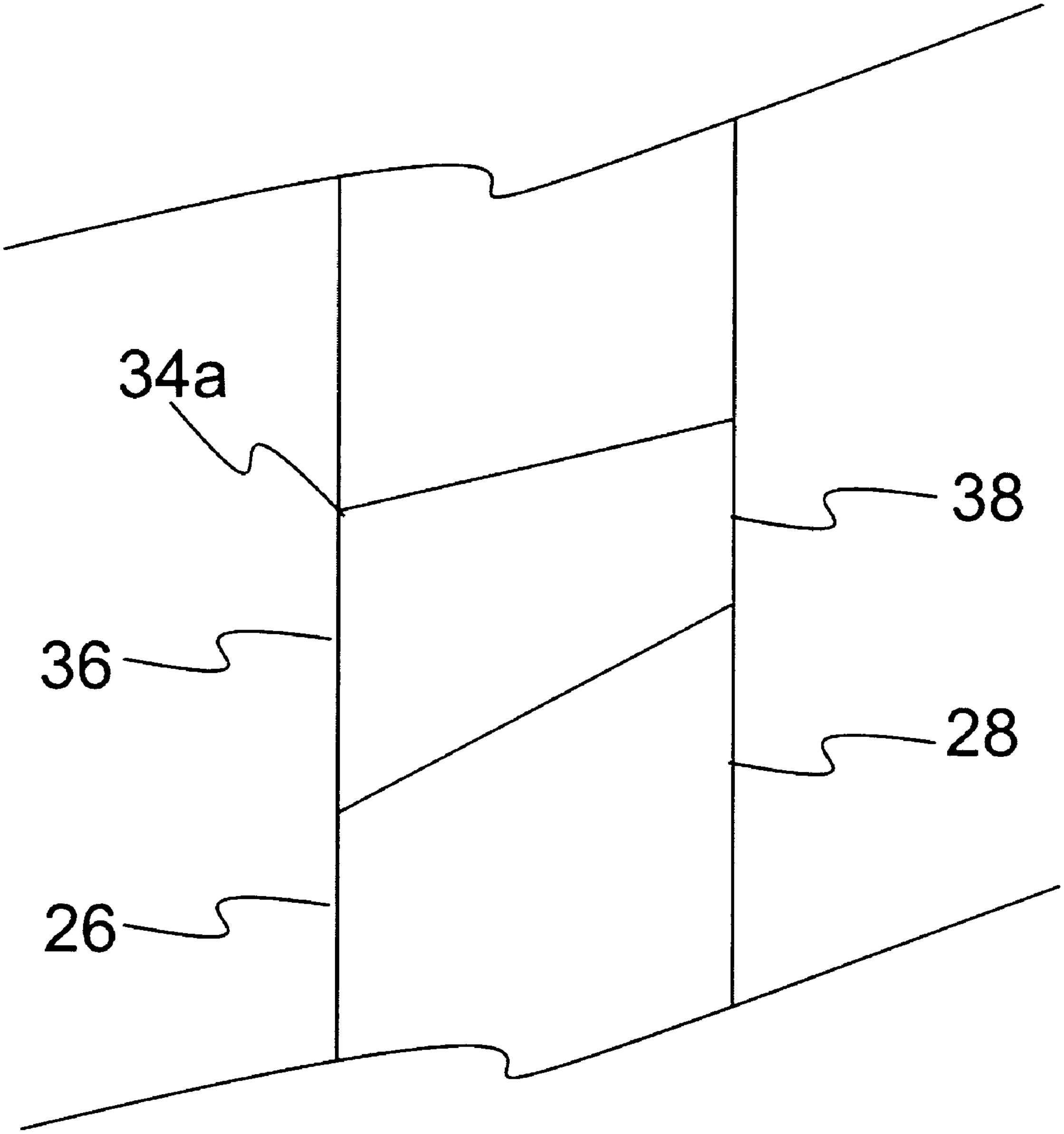
FIG. 2 depicts a cross section of the funnels used in the method.

FIG. 2 depicts a cross section of one of the funnels (34*a*). The funnel (34*a*) has a large opening (36) on the interior side (26) and a small opening (38) on the exterior side (28).

Exemplary biological benefits provided by the method provides fluid include improved crop yield; improved pest resistance in crops; improved crop health; increased milk production in dairy cattle; improvement in animal health; improved resistance of animals to disease and infection; and increased growth rates and production rates in plants and animals. Other agriculture and health benefits include improved sterilization of water with high microbial content; improved crop grass growth and condition, increased crop productivity, increased water percolation into soil, increased efficiency of fertilizers and nutrients; improved plant drought tolerance, and improved leaching of salts into subsoil.

The method contemplates using a multi-chambered apparatus which can be made from two chambers of stainless steel, polyvinyl chloride, a stiff elastomeric material, glass, fiberglass, other metals and alloys thereof, plastic composites and combinations thereof.

The fluid affected by the method can be water, suspensions of water, mixtures, solutions, and combinations thereof.

Figure 3:
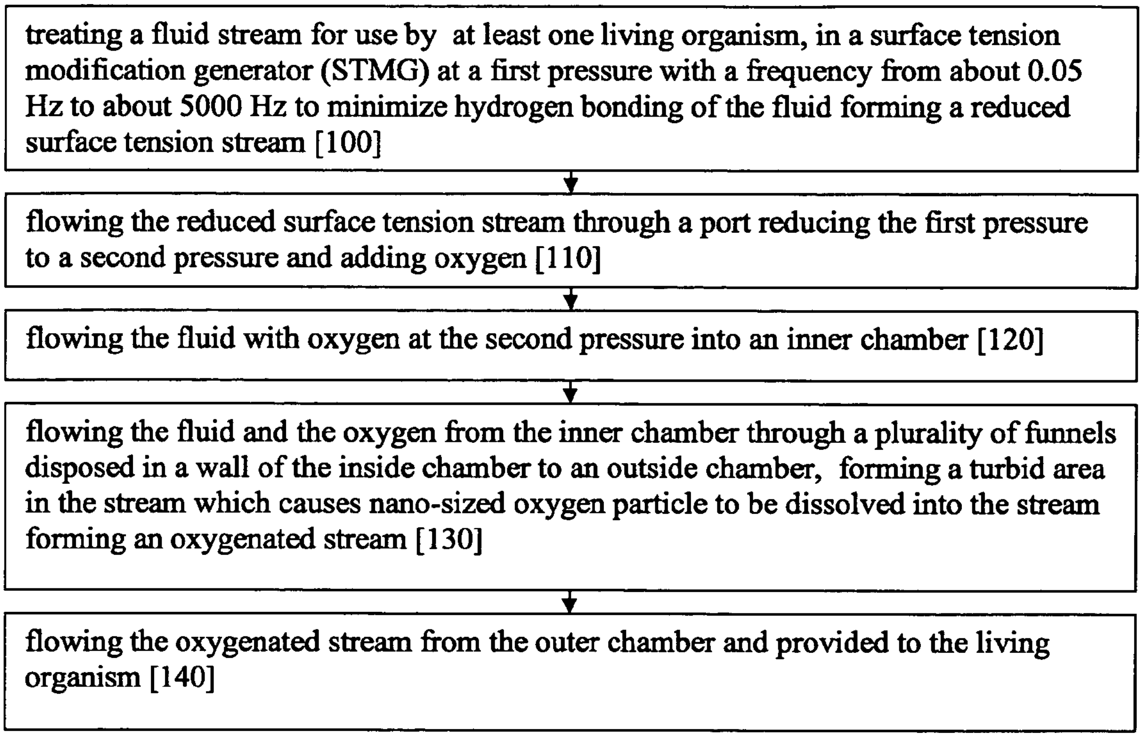
FIG. 3 provides the steps of the method in diagram form.

FIG. 3 depicts a flow chart of an embodiment of the method for treating a living organism to increase nutrient ingestion.

The first step in the method is treating a fluid stream for use by at least one living organism, in a surface tension modification generator (STMG) at a first pressure with a frequency from about 0.05 Hz to about 5000 Hz to minimize hydrogen bonding of the fluid forming a reduced surface tension stream [100].

The next step in the method can be flowing the reduced surface tension stream through a port reducing the first pressure to a second pressure and adding oxygen [110].

After oxygen is added, the next step can be flowing the fluid with oxygen at the second pressure into an inner chamber [120].

Once the fluid is in the inner chamber, the next step is flowing the fluid and the oxygen from the inner chamber through a plurality of funnels disposed in a wall of the inside chamber to an outside chamber, forming a turbid area in the stream which causes nano-sized oxygen particle to be dissolved into the stream forming an oxygenated stream [130].

The last step of the method can be flowing the oxygenated stream from the outer chamber and provided to the living organism [140].

While these embodiments have been described with emphasis on the embodiments, it should be understood that within the scope of the appended claims the embodiments might be practiced other than as specifically described herein.

What is claimed is:

1. A method for treating a living organism to increase nutrient ingestion comprising:

a. treating a fluid stream for use by at least one living organism in a surface tension modification generator (STMG) at a first pressure with a frequency from about 0.05 Hz to about 5000 Hz to minimize hydrogen bonding of the fluid forming a reduced surface tension stream;

b. flowing the reduced surface tension stream through a port reducing the first pressure to a second pressure and adding a gas;

c. flowing the reduced surface tension stream with the gas at the second pressure into an inner chamber of a multichamber device;

d. flowing the reduced surface tension stream from the inner chamber through at least two funnels disposed in a wall of the inner chamber creating a turbid zone in an outer chamber of the multichamber device by a pressure drop wherein nano-sized particles of the gas are dissolved into the reduced surface tension stream forming a dissolved gas stream; and e. flowing the dissolved gas stream from the outer chamber for use by a living organism to increase nutrient ingestion.

2. The method of claim 1, wherein the fluid stream comprises water, mixtures, solutions, fluidized solids, suspensions, and combinations thereof.

3. The method of claim 1, wherein the living organisms are selected from the group consisting of: fish, crustaceans, farm animals, macro-organisms, micro-organisms, humans, domestic animals, farm birds, animals in zoos, and aquatic creatures in aquariums.

4. The method of claim 1, wherein the living organisms are agricultural crops, aquaculture crops, house plants, or office plants.

5. The method of claim 4, wherein the agricultural crops include corn, wheat, rice, cotton, kenaf, sugar cane, alfalfa, tomatoes, lettuce, cucumber, peppers, sorghum, and combinations thereof.

6. The method of claim 1, wherein the gas is oxygen, ozone, air, ethylene, carbon dioxide, carbon monoxide, ethylene oxide, or combinations thereof.

7. The method of claim 1, wherein the step of flowing the reduced surface tension stream through the at least two funnels includes using from about 2 funnels to about 168 funnels.

8. The method of claim 1, wherein the step of flowing the gas into the port is at a gas pressure from about 1 to about 100 psi.

9. The method of claim 1, wherein the flowing of the reduced surface tension stream into the inner chamber is at a rate from about 0.5 gallon to about 600 gallons per minute.

10. The method of claim 1, wherein the frequency used is a variable frequency.

11. The method of claim 1, further comprising providing at least two different frequencies to treat the fluid in the STMG.

12. The method of claim 1, wherein the frequency ranges from about 456 Hz to about 457 Hz.

13. The method of claim 1, wherein the at least two funnels are tapered.

14. The method of claim 1, wherein the at least two funnels are directed at a focus point.

* * * * *